United States Patent [19]

Makino et al.

[11] Patent Number: 4,629,672

[45] Date of Patent: Dec. 16, 1986

[54] LIGHT-SENSITIVE COMPOSITION HAVING A TETRAKISAZO COMPOUND

[75] Inventors: Naonori Makino; Kenji Sano; Seiji Horie; Hideo Sato, all of Kanagawa, Japan

[73] Assignee: Fuji Photo Film Co., Ltd., Kanagawa, Japan

[21] Appl. No.: 797,553

[22] Filed: Nov. 13, 1985

[30] Foreign Application Priority Data

Nov. 13, 1984 [JP] Japan .................. 59-239217

[51] Int. Cl.$^4$ .................. G03G 5/06; G03G 5/14
[52] U.S. Cl. .................. 430/76; 430/75; 430/56; 534/806
[58] Field of Search .................. 430/75, 76; 534/689, 534/806

[56] References Cited

U.S. PATENT DOCUMENTS 4,427,753  1/1984  Fujimura et al. .................. 534/689
4,471,040  9/1984  Katagiri et al. .................. 430/76
4,571,369  2/1986  Yamashita et al. .................. 430/76

Primary Examiner—John L. Goodrow
Attorney, Agent, or Firm—Sughrue, Mion, Zinn, Macpeak, and Seas

[57] ABSTRACT

A light-sensitive composition is disclosed, containing at least one of tetrakisazo compounds having the following general formula [1]:

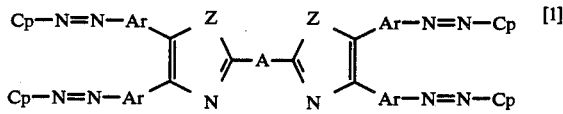

wherein Cp represents a coupler residue; A is a single bond,

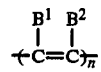

in which n is an integer of from 1 to 3, or a divalent aromatic organic residue, and $B^1$ and $B^2$ each represents a hydrogen atom or an electron attractive group; Z represents

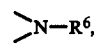

—O—, —S— or —Se—, in which $R^6$ represents a hydrogen atom, a substituted or unsubstituted lower alkyl group, a substituted or unsubstituted aryl group, a substituted or unsubstituted alkoxycarbonyl group, a substituted or unsubstituted aryloxycarbonyl group or a substituted or unsubstituted acyl group; and Ar represents a substituted or unsubstituted divalent aromatic carbon ring group, or a substituted or unsubstituted divalent heterocyclic aromatic ring group.

An electrophotographic light-sensitive material is also disclosed, comprising an electrically conductive support and a layer containing an electric charge carrier transporting compound and the tetrakisazo compound as an electric charge carrier generating compound.

An electrophotographic light-sensitive material is further disclosed, comprising an electrically conductive support, an electric charge carrier transporting layer containing an electric charge carrier transporting compound, and an electric charge carrier generating layer containing the tetrakisazo compound.

15 Claims, 2 Drawing Figures

LIGHT-SENSITIVE COMPOSITION HAVING A TETRAKISAZO COMPOUND

FIELD OF THE INVENTION

The present invention relates to a photoconductive composition containing a novel tetrakisazo compound. The present invention further relates to an optical information record medium of heat mode wherein recording and reproduction are carried out by causing change in state by a high density energy beam.

BACKGROUND OF THE INVENTION

Electrophotography, as disclosed in U.S. Pat. No. 2,297,691 to Carlson, uses a photoconductive material comprising a support coated with a substance which is insulating in the dark, and having an electric resistance which changes according to the amount of exposure received during imagewise exposure. After this photoconductive material is subjectd to keep in dark for a suitable period, the surface is uniformly charged in the dark. Then, this material is imagewise exposed to light using an irradiation pattern having the effect of reducing the surface electric charge in a pattern corresponding to the relative energy contained in various parts of the irradiation pattern. The surface electric charge or electrostatic latent image left on the surface of the photoconductive substance layer (electrophotographic light-sensitive light) is then contacted with a suitable electroscopic indicating substance, e.g., toner, to form a visible image.

The toner is contained in an insulating liquid or a dried carrier, and in either case it adheres to the surface of the electrophotographic light-sensitive layer according to the electric charge pattern. The adhering indicating substance can be fixed by known means such as by heat, pressure or vapor of a solvent. The electrostatic latent image can be transferred to a second support (for example, paper or films). The electrostatic latent image can be developed on the second support in a similar fashion after being transferred. Electrophotography is one image forming process in which the image is formed as described above.

In such an electrophotographic process, the basic characteristics required for electrophotographic light-sensitive materials are that (1) they can be electrified in the dark so as to have a suitable electric potential, (2) the disappearance of electric charge in the dark is small, and (3) the electric charge can be rapidly reduced by exposure to light.

Conventionally as photoconductive substances for electrophotographic light-sensitive materials use has been made of selenium, cadmium sulfide, zinc oxide, etc.

However, the above described inorganic substances conventionally used in electrophotographic processes have both faults and advantages. For example, selenium which is widely used at present satisfies the above described requirements (1) to (3), but has the disadvantages that its production requires severe conditions and high production cost, it is inflexible and difficult to process into a belt-like form, and it requires careful handling because it is sensitive to heat and mechanical impact. Cadmium sulfide and zinc oxide are used as electrophotographic light-sensitive materials dispersed in a resin which is a binder. However, they cannot be repeatedly used in such a state, because of mechanical deficiencies in smoothness, hardness, tensile strength and friction resistance.

In recent years, to improve these faults of inorganic substances, electrophotographic light-sensitive materials using various organic substances have been proposed and some of them have been put in practical use. Examples include electrophotographic light-sensitive materials containing poly-N-vinylcarbazole and 2,4,7-trinitrofluoren-9-one (U.S. Pat. No. 3,484,237), or poly-N-vinylcarbazole sensitized with pyrylium salt type dyes [Japanese Patent Publication No. 25658/73 (U.S. Pat. No. 3,617,268)], electrophotographic light-sensitive materials containing an organic pigment as a main component [Japanese Patent Application (OPI) No. 37543/72 (U.S. Pat. No. 3,898,084)] and electrophotographic light-sensitive materials containing an eutectic crystal complex composed of a dye and a resin as a main component [Japanese Patent Application (OPI) No. 10735/72 (U.S. Pat. Nos. 3,732,180 and 3,684,502)] (the term "OPI" as used herein refers to a "published unexamined Japanese patent application").

Electrophotographic light-sensitive materials using such organic materials are high in productivity, can provide inexpensive light-sensitive materials, and can be improved in mechanical properties and flexibility since they can be produced by coating by choosing a binder suitably. In addition, the light-sensitive wavelength can be arbitrarily controlled by choosing a dye and an organic pigment. However, the light-sensitivity is low and it is not suitable to be used repeatedly, which does not satisfy well enough the requirement for an electrophotographic light-sensitive material.

As the results of thorough studies by the inventors to overcome these faults of the conventional electrophotographic light-sensitive materials, it has been found that an electrophotographic light-sensitive material using a photoconductive composition containing a novel tetrakisazo compound has high sensitivity and high durability (repeated use) enough to be used in practice.

On the other hand, since the conventional recording method wherein a beam having a high energy density is irradiated on an information recording medium to change the physical constants, such as transmittance, reflectance, refractive index, etc., is characterized in that it can form an image having contrast with a quite high resolving power, information can be added afterward, recording can be effected simultaneously with exposure to light, and that it has other characteristics, it has advantages in that it is suitable for recording an output of an electronic computer and transmitted time series signals, and is used for COM (computer output micro), microfacsimiles, printing masters, optical disks, etc.

For example, the recording medium used in optical disk technique includes fine pits on the order of about 1μ that can be detected optically and are arranged in the form of a helical track or circular tracks and can store high density information. To write information onto such a disk, a laser beam converged on the surface of a laser beam-sensitive layer is scanned so that pits may be formed only in the surface irradiated with the laser beam, which pits should be formed in the form of a helical track or circular tracks. In the recording system of heat mode, a laser beam-sensitive layer absorbs the heat energy when irradiated with a laser beam whereby the concave part is formed with pits due to evaporation or melting.

The information thus recorded in an optical disk can be detected by scanning a laser beam along the track to read the optical change caused by the presence or absence of the pits.

As such an information recording medium capable of recording by heat mode, use has been made a recording medium wherein a transparent support of plastics or the like has thereon a thin film of a metal and/or a metal oxide metalloid dielectric, etc. or a thin film containing a self-oxidizing binder and a dye and a protective layer thereon.

However, since the conventional thin film mainly consisting of inorganic materials is high in reflectance with respect to laser beam, the efficiency of the use of the laser beam is low, and therefore high sensitivity characteristic cannot be obtained or the output of the laser beam when recording is effected must be increased remarkably.

On the other hand, the nearer the longer wave length region, generally the more unstable the absorption characteristic of organic compounds, so that a little elevation of temperature is liable to decompose them.

Therefore, it is required that the absorption efficiency of the laser beam required for a recording medium having capability of direct reading and writing is high, an enough reflectance is secured to be able to control the focus when reading of the record is carried out, and various characteristics such as stability of the recorded image must be satisfied. In this regard, a recording medium containing an organic thin film satisfactory enough from practical points of view has not yet been developed.

In view of the above points, to overcome the above faults the inventors have intensively studied to find the present invention.

SUMMARY OF THE INVENTION

An object of the present invention is to provide a photoconductive composition that can be applied to various photoconductive materials.

Another object of the present invention is to provide an electrophotographic light-sensitive material that is high in sensitivity and has stable electric potential characteristic when used repeatedly.

Yet another object of the present invention is to provide an optical information recording medium that is high in storability and sensitivity and has an enough S/N ratio.

Therefore the present invention provides a photosensitive composition containing at least one of tetrakisazo compound represented by the following general formula:

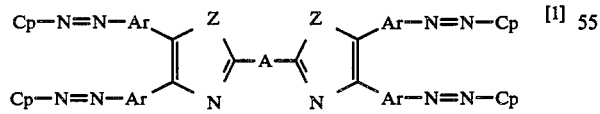

wherein each of the symbols is defined below:

DETAILED DESCRIPTION OF THE INVENTION

Figure 1:
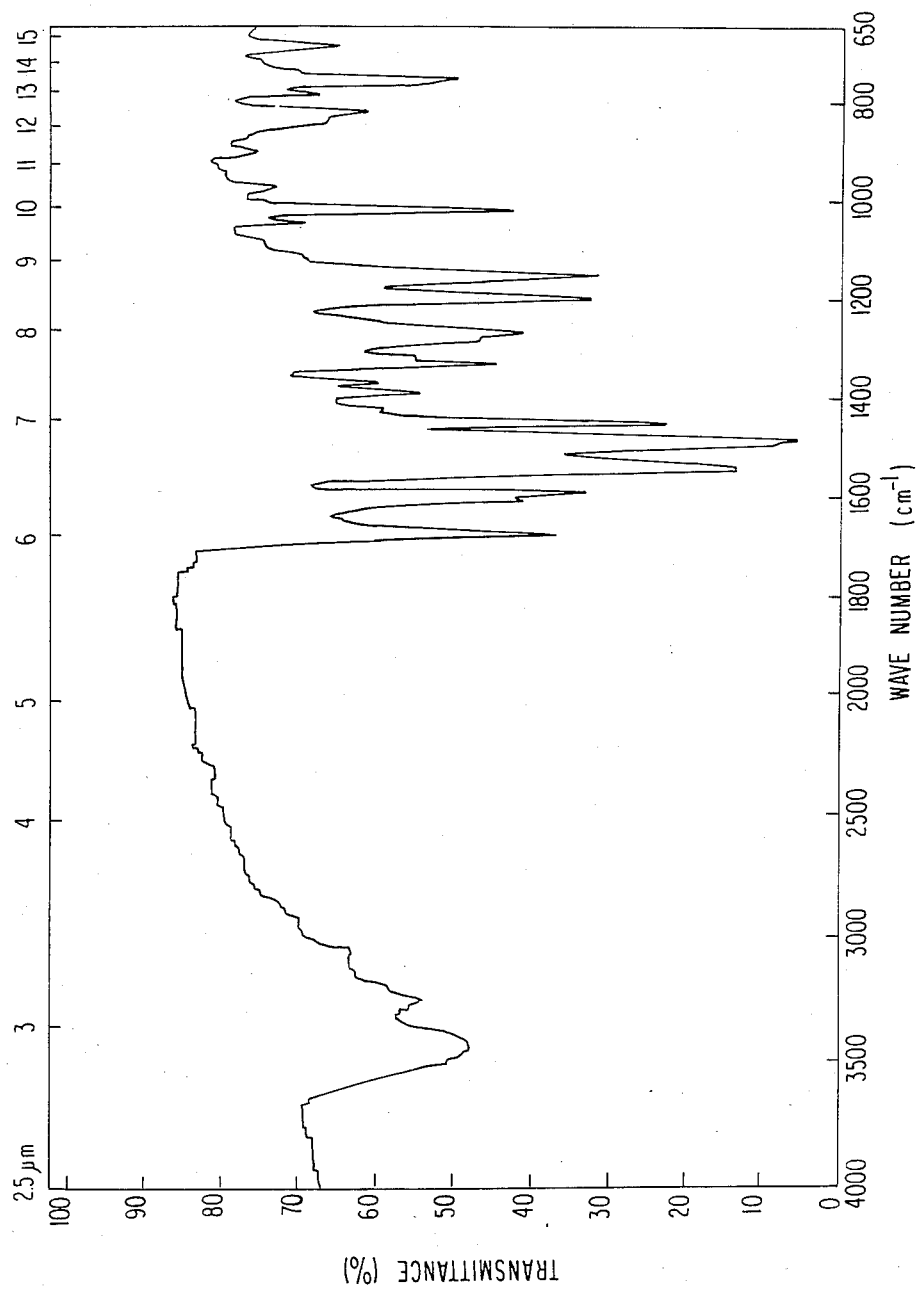
FIG. 1 shows the IR absorption spectrum (KBr tablet method) of the tetrakisazo compound (the compound synthesized in Synthesis Example 1) according to the present invention.

In the general formula [1], Cp represents a coupler residue, which is preferably selected from the following coupler constituents:

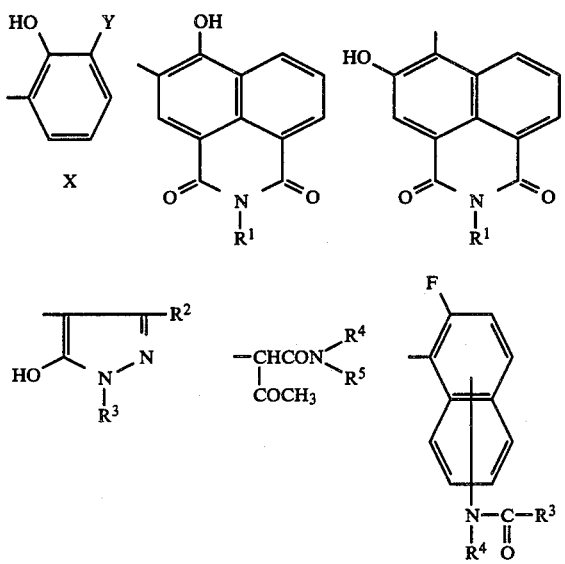

wherein
X represents an atomic group required for forming an aromatic ring or heterocyclic ring together by fusing with the benzene ring having a hydroxyl group and Y (which atomic group may or may not be substituted);
Y represents a hydrogen atom, $-CONR^4R^5$, $-COOR^4$, $-CONHNR^4R^5$, $-CONHN=CH-R^4$, or

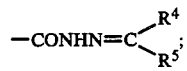

$R^1$ represents an alkyl group or a phenyl group, each of which groups may be substituted;
$R^2$ represents a hydrogen atom, a lower alkyl group, a carbamoyl group, a carboxyl group, an alkoxycarbonyl group, an aryloxycarbonyl group, or a substituted or unsubstituted amino group;
$R^3$ represents an alkyl group, an aromatic ring group, or a heterocyclic aromatic ring group, each of which groups may be substituted; and
$R^4$ and $R^5$ each represents a hydrogen atom or an alkyl group, an aromatic ring group, or a heterocyclic aromatic ring group, each of which groups may be substituted.
Z represents $N-R^6$, $-O-$, $-S-$, or $-Se-$.
$R^6$ includes a hydrogen atom, a $C_{1-6}$ alkyl group, a $C_{6-20}$ aryl group, a $C_{1-12}$ alkoxy group-containing alkoxycarbonyl group, a $C_{6-20}$ aryloxycarbonyl group, and a $C_{1-20}$ acyl group.

In case that $R^6$ is an unsubstituted alkyl group, examples of them are a methyl group, an ethyl group, a propyl group, a butyl group, a pentyl group, a hexyl group, an isopropyl group, an isobutyl group, an isohexyl group, a neopentyl group, a tert-butyl group, etc.

In case that $R^6$ is a substituted alkyl group, the substituents include a hydroxyl group, a $C_{1-12}$ alkoxy group, a cyano group, a $C_{1-8}$ alkylamino group, a dialkylamino group having two $C_{1-8}$ alkyl groups, a halogen atom, a $C_{6-15}$ aryl group, etc. As examples thereof can be mentioned a hydroxyalkyl group (such as a hydroxymethyl group, a 2-hydroxyethyl group, a 3-hydroxypropyl group, a 2-hydroxypropyl group, etc.), an alkoxyalkyl group (such as a methoxymethyl group, a 2-methoxyethyl group, a 3-methoxypropyl group, an ethoxymethyl group, a 2-ethoxyethyl group, etc.), a cyanoalkyl group (such as a cyanomethyl group, a 2-cyanoethyl group, etc.), an (alkylamino)alkyl group [such as a (methylamino)methyl group, a 2-(methylamino)ethyl group, an (ethylamino)methyl group, etc.], a (dialkylamino)alkyl group [such as a (dimethylamino)methyl group, a 2-(dimethylamino)ethyl group, etc.], a halogenalkyl group (such as a fluoromethyl group, a chloromethyl group, a bromomethyl group, etc.), and an aralkyl group (such as a benzyl group, a phenethyl group, etc.).

In case that $R^6$ is an unsubstituted alkoxycarbonyl group, examples thereof include a methoxycarbonyl group, an ethoxycarbonyl group, a propoxycarbonyl group, a butoxycarbonyl group, a benzyloxycarbonyl group, etc.

In case that $R^6$ is an unsubstituted aryl group or an unsubstituted aryloxycarbonyl group, examples thereof includes a phenyl group, a naphthyl group, a pyridyl group, a phenoxycarbonyl group, a naphthoxycarbonyl group, etc.

In case that $R^6$ is an unsubstituted acyl group, examples thereof include an acetyl group, a propionyl group, a benzoyl group, a naphthoyl group, a nicotinoyl group, etc.

In case that $R^6$ is a substituted alkoxycarbonyl group, a substituted aryloxycarbonyl group, or a substituted acyl group, the substituents may be the same as those for the substituted alkyl groups in $R^6$, and the number of the substituents may be from 1 to 3 that may be the same or different, with the combination and the positions of the substituents being arbitrary.

X is a group capable of forming, by fusing together with the benzene ring having a hydroxyl group and Y, an aromatic ring such as a naphthalene ring, an anthracene ring, etc. or a heterocyclic ring such as an indole ring, a carbazole ring, a benzocarbazole ring, a dibenzofuran ring, etc.

In case that X is an aromatic ring or heterocyclic ring having a substituent or two substituents that may be the same or different, the substituents include a halogen atom (e.g., a fluorine atom, a chlorine atom, a bromine atom, etc.), a lower alkyl group and preferably a $C_{1-8}$ alkyl group (e.g., a methyl group, an ethyl group, a propyl group, a butyl group, an isopropyl group, an isobutyl group, etc.), etc.

$R^1$ can include an alkyl group and preferably an alkyl group having 1 to 12 carbon atoms, or a phenyl group.

When $R^1$ represents an unsubstituted alkyl group, examples include a methyl group, an ethyl group, a propyl group, a butyl group, a pentyl group, a hexyl group, an isopropyl group, an isobutyl group, an isoamyl group, an isohexyl group, a neopentyl group and a tert-butyl group.

When $R^1$ represents a substituted alkyl group, the substituents include a hydroxyl group, an alkoxy group having 1 to 12 carbon atoms, a cyano group, an amino group, an alkylamino group having 1 to 12 carbon atoms, a dialkylamino group with each of two alkyl groups having 1 to 12 carbon atoms, a halogen atom and an aryl group having 6 to 15 carbon atoms. Examples include a hydroxyalkyl group (for example, a hydroxymethyl group, a 2-hydroxyethyl group, a 3-hydroxypropyl group and a 2-hydroxypropyl group), an alkoxyalkyl group (for example, a methoxymethyl group, a 2-methoxyethyl group, a 3-methoxypropyl group, an ethoxymethyl group and a 2-ethoxyethyl group), a cyanoalkyl group (for example, a cyanomethyl group and a 2-cyanoethyl group), an aminoalkyl group (for example, an aminomethyl group, a 2-aminoethyl group and a 3-aminopropyl group), an (alkylamino)alkyl group [for example, a (methylamino)methyl group, a 2-(methylamino)ethyl group and an (ethylamino)methyl group], a (dialkylamino)alkyl group [for example, a (dimethylamino)methyl group and a 2-(dimethylamino)ethyl group], a halogenoalkyl group (for example, a fluoromethyl group, a chloromethyl group and a bromomethyl group), and an aralkyl group (for example, a benzyl group and a phenethyl group).

When $R^1$ represents a substituted phenyl group, the substituents include a hydroxyl group, an alkoxy group having 1 to 12 carbon atoms, a cyano group, an amino group, an alkylamino group having 1 to 12 carbon atoms, a dialkylamino group with each of two alkyl groups having 1 to 12 carbon atoms, a halogen atom, an alkyl group having 1 to 6 carbon atoms and a nitro group. Examples include a hydroxyphenyl group, an alkoxyphenyl group (for example, a methoxyphenyl group and an ethoxyphenyl group), a cyanophenyl group, an aminophenyl group, an (alkylamino)phenyl group [for example, a (methylamino)phenyl group and an (ethylamino)phenyl group], a (dialkylamino)phenyl group [for example, a (dimethylamino)phenyl group], a halogenophenyl group (for example, a fluorophenyl group, a chlorophenyl group and a bromophenyl group), an alkylphenyl group (for example, a tolyl group, an ethylphenyl group, a cumenyl group, a xylyl group and a mesityl group) and a nitrophenyl group, and the substituted phenyl group represented by $R^1$ may have 1, 2 or 3 of the above substituents, which may be the same or different. The position of the substituent, or the positions of plural substituents is not limited.

As $R^2$, a hydrogen atom, a lower alkyl group having 1 to 6 carbon atoms, a carbamoyl group, a carboxyl group, an alkoxycarbonyl group in which the alkoxy group has 1 to 12 carbon atoms, an aryloxycarbonyl group in which the aryloxy group has 6 to 20 carbon atoms, or a substituted or unsubstituted amino group is preferred.

When $R^2$ represents a substituted amino group, examples include a methylamino group, an ethylamino group, a propylamino group, a phenylamino group, a tolylamino group, a benzylamino group, a phenethylamino group, a dimethylamino group, a diethylamino group and a diphenylamino group.

When $R^2$ represents a lower alkyl group, examples include a methyl group, an ethyl group, a propyl group, a butyl group, an isopropyl group and an isobutyl group.

When $R^2$ represents an alkoxycarbonyl group, examples include a methoxycarbonyl group, an ethoxycarbonyl group, a propoxycarbonyl group, a butoxycarbonyl group, an isopropoxycarbonyl group and a benzyloxycarbonyl group.

When $R^2$ represents an aryloxycarbonyl group, examples include a phenoxycarbonyl group and a toluoxycarbonyl group.

As $R^3$ and $R^5$, an alkyl group having 1 to 20 carbon atoms, an aromatic ring group such as a phenyl group or a naphthyl group, and a heterocyclic aromatic ring group containing an oxygen atom, a nitrogen atom or a sulfur atom, such as a dibenzofuranyl group, a carbazolyl group or a benzocarbazolyl group, any of which may be further substituted, are preferred.

When $R^3$ or $R^5$ represents a substituted or unsubstituted alkyl group, examples include the substituted or unsubstituted alkyl groups described for $R^1$.

When $R^3$ or $R^5$ represents a substituted aromatic ring group such as a substituted phenyl group or a substituted naphthyl group, or a substituted heterocyclic aromatic ring group containing hetero atoms, such as a substituted dibenzofuranyl group or a substituted carbazolyl group, examples of substituents include a hydroxy group, a cyano group, a nitro group, a halogen atom (for example, a fluorine atom, a chlorine atom and a bromine atom), an alkyl group having 1 to 12 carbon atoms (for example, a methyl group, an ethyl group, a propyl group and an isopropyl group), an alkoxy group having 1 to 12 carbon atoms (for example, a methoxy group, an ethoxy group, a propoxy group, a butoxy group, a pentyloxy group, an isopropoxy group, an isobutoxy group, an isoamyloxy group, a tert-butoxy group and a neopentyloxy group), an amino group, an alkylamino group having 1 to 12 carbon atoms (for example, a methylamino group, an ethylamino group and a propylamino group), a dialkylamino group having 1 to 12 carbon atoms (for example, a dimethylamino group, a diethylamino group and an N-methyl-N-ethylamino group), an arylamino group having 6 to 12 carbon atoms (for example, a phenylamino group and a tolylamino group), a diarylamino group with each of two aryl groups having 6 to 15 carbon atoms (for example, a diphenylamino group), a carboxyl group, an alkali metal carboxylate group (examples of alkali metals (cations) include $Na^\oplus$, $K^\oplus$ and $Li^\oplus$, an alkali metal sulfonato group (examples of alkali metals (cations) include $Na^\oplus$, $K^\oplus$ and $Li^\oplus$), an alkylcarbonyl group (for example, an acetyl group, a propionyl group and a benzylcarbonyl group), an arylcarbonyl group having an aryl group having 6 to 12 carbon atoms (for example, a benzoyl group and a toluoyl group), an alkylthio group having 1 to 12 carbon atoms (for example, a methylthio group and an ethylthio group), and an arylthio group having 6 to 12 carbon atoms (for example, a phenylthio group and a tolylthio group). The number of the substituents for $R^3$ or $R^5$ is 1 to 3, and if the number of substituents is greater than 1, the substituents may be the same or different and may be present in any combination. In addition, they may be bonded to any position.

$R^4$ can include a hydrogen atom, a substituted or unsubstituted alkyl group having 1 to 20 carbon atoms, an aromatic ring group such as a phenyl group or a naphthyl group, and a heterocyclic aromatic ring group containing an oxygen atom, a nitrogen atom or a sulfur atom, such as a dibenzofuranyl group, a carbazolyl group or a benzocarbazolyl group, any of which may be further substituted.

In case that $R^4$ is a substituted or unsubstituted alkyl group, aromatic ring group or heterocyclic aromatic ring group, examples of the group may be the same as those for $R^3$ and $R^5$.

In case that Cp is

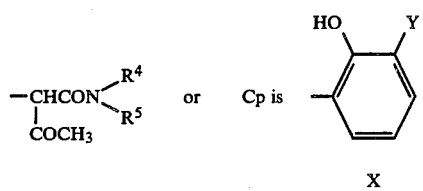

and Y is $-CONR^4R^5$, $-CONHNR^4R^5$ or

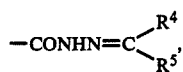

$R^4$ and $R^5$ may form together with the nitrogen atom or the carbon atom a ring. Examples of them are a pyrrolidine ring, a piperidine ring, a morpholine ring, a cyclopentane ring, and a cyclohexane ring.

A represents a single bond,

wherein n is an integer of from 1 to 3, or an aromatic divalent organic residue.

Examples of the divalent organic residue are those shown below and their substituted divalent organic residues wherein examples of the substituents may be the same groups as those defined for $R^3$ and $R^5$ mentioned above.

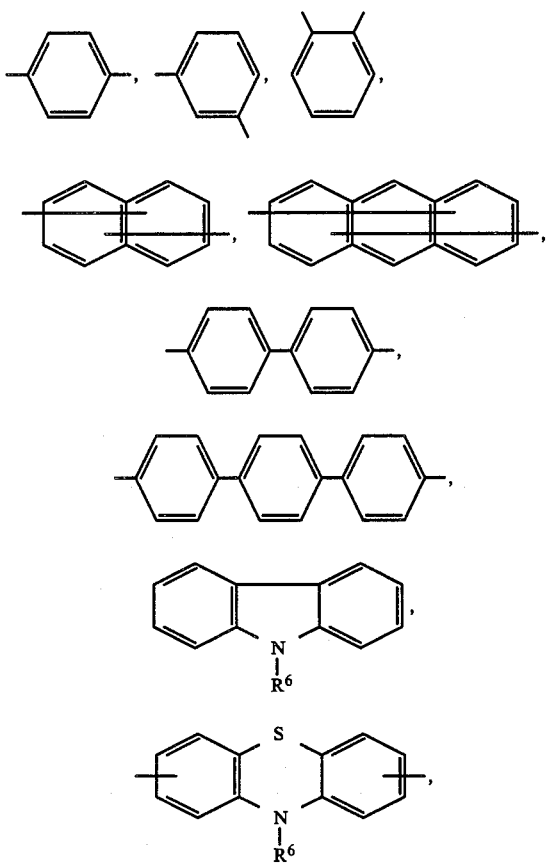

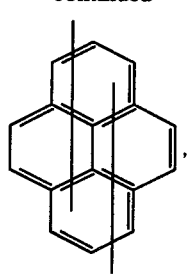

In the above examples, R⁶ has the same meaning as those defined for R⁶ in the general formula [1].

B¹ and B² each represents a hydrogen atom or an electron attractive group. Examples of the electron attractive group are a halogen atom (e.g., a fluorine atom, a chlorine atom, a bromine atom, etc.), a nitro group, a cyano group, and an alkoxycarbonyl group (e.g., a methoxycarbonyl group, an ethoxycarbonyl group, etc.).

Ar represents a divalent aromatic carbon ring group or a divalent heterocyclic aromatic ring group, each of which groups may be substituted. Examples of them are divalent aromatic carbon ring groups and divalent heterocyclic aromatic ring groups having the formulae given below, that may be substituted:

The substituents may be the same as those defined above for R³ and R⁵.

In case that Cp is $$\text{(structure with OH and N-R-R}^3\text{, R}^4\text{, O)} \quad , \text{ the } -\underset{\underset{R^4}{|}}{N}-\underset{\underset{O}{\|}}{C}-R^3$$

may be located in any of from the 3-position to the 8-position of the naphthalene ring, with the 8-position being preferred.

Of tetrakisazo compounds represented by the general formula [1] according to the present invention, tetrakisazo compounds represented by the general formula [2] given below are preferred, which does not mean to restrict the present invention, because they can provide a photoconductive composition high in light-sensitivity or an electrophotograph high in light-sensitivity and excellent in durability, or the raw material compounds required for their production are easily available to produce tetrakisazo compounds at low cost.

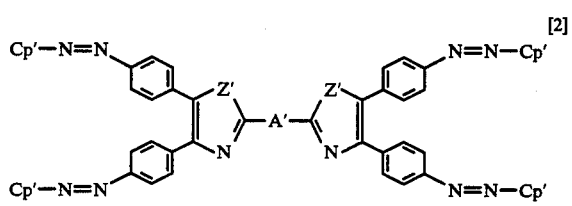

wherein A′ represents a single bond, —CH=CH—,

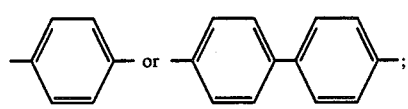

Z' represents —O—,

—S— or —Se—; and Cp' preferably represents

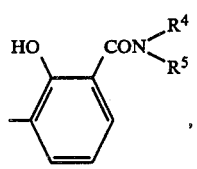

wherein $R^4$, $R^5$ and $R^6$ have the same meanings as those defined for $R^4$, $R^5$ and $R^6$ in the general formula [1], and X' represents a benzene ring, a naphthalene ring, a carbazole ring or a dibenzofuran ring.

Further, examples of Cp' are coupler residues given in Table 1.

TABLE 1

| No. of Cp' | Cp' |
|---|---|
| (Cp-1) | 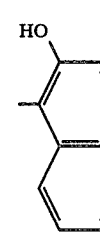 |
| (Cp-2) | 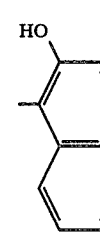 |
| (Cp-3) | 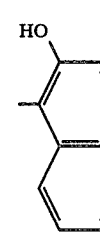 |

TABLE 1-continued

| No. of Cp' | Cp' |
|---|---|
| (Cp-4) | 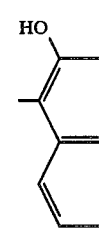 |
| (Cp-5) | 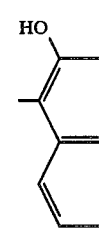 |
| (Cp-6) | 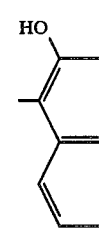 |
| (Cp-7) | 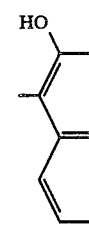 |
| (Cp-8) | 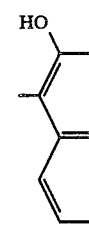 |
| (Cp-9) | 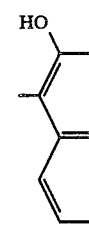 |

TABLE 1-continued
| No. of Cp' | Cp' |
|---|---|
| (Cp-10) | 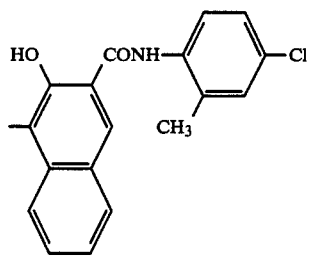 |
| (Cp-11) | 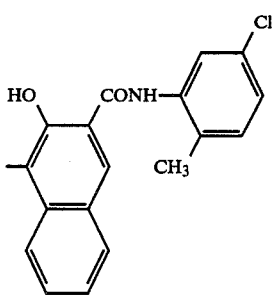 |
| (Cp-12) | 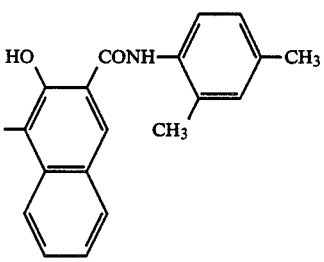 |
| (Cp-13) | 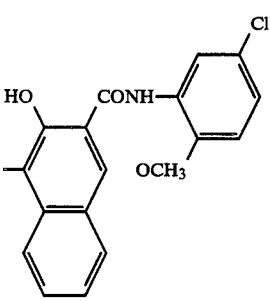 |
| (Cp-14) | 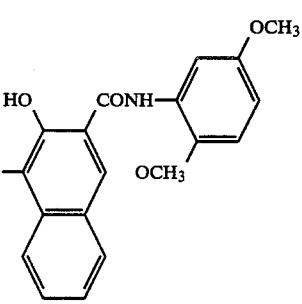 |
TABLE 1-continued
| No. of Cp' | Cp' |
|---|---|
| (Cp-15) | 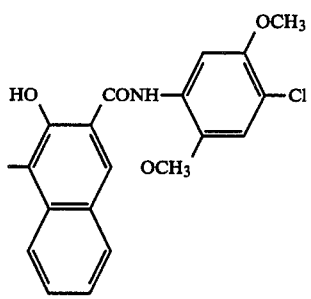 |
| (Cp-16) | 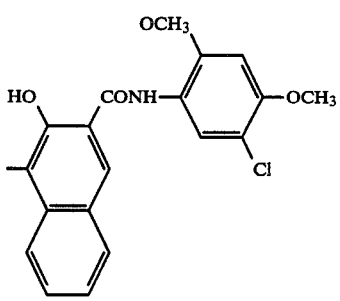 |
| (Cp-17) | 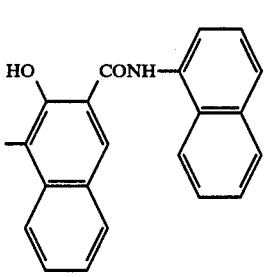 |
| (Cp-18) | 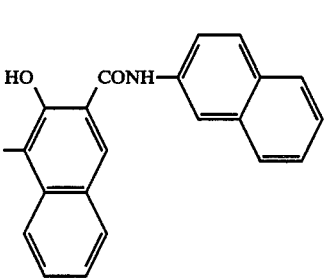 |
| (Cp-19) | 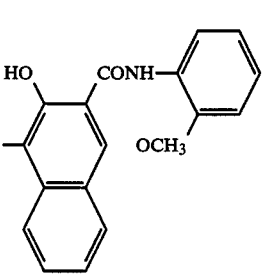 |

TABLE 1-continued
| No. of Cp' | Cp' |
|---|---|
| (Cp-20) | 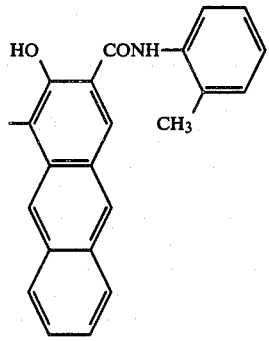 |
| (Cp-21) | 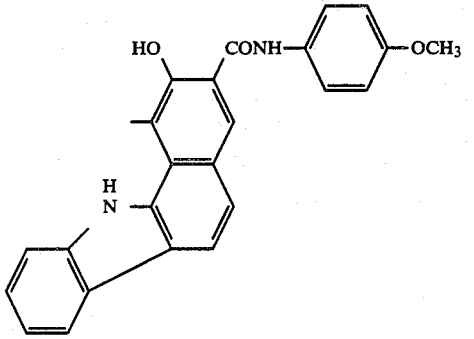 |
| (Cp-22) | 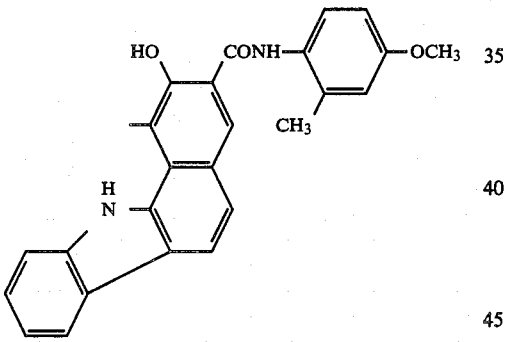 |
| (Cp-23) | 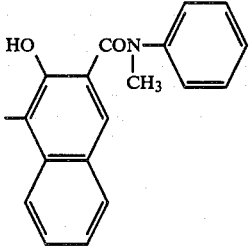 |
| (Cp-24) | 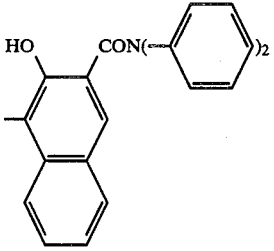 |
| (Cp-25) | 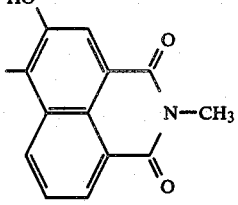 |
| (Cp-26) | 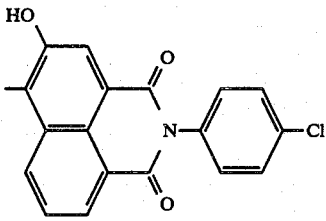 |
| (Cp-27) | 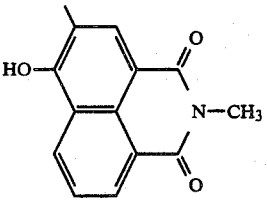 |
| (Cp-28) | 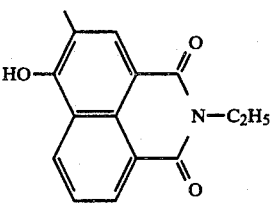 |
| (Cp-29) | 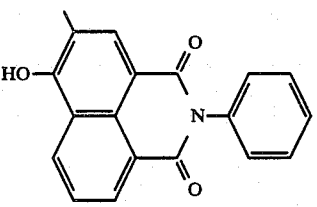 |
| (Cp-30) | 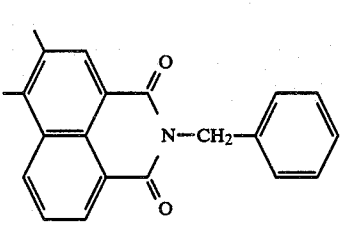 |
| (Cp-31) | 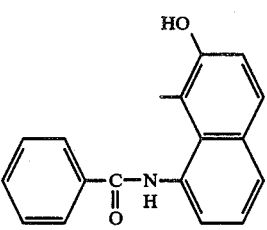 |

TABLE 1-continued

| No. of Cp' | Cp' |
|---|---|
| (Cp-32) | ![structure: 4-chlorobenzoyl amino naphthol with methyl] |
| (Cp-33) | ![pyrazole structure: 3-methyl-5-hydroxy-1-phenylpyrazole] |
| (Cp-34) | ![pyrazole structure: 3-methyl-5-hydroxy-1-(4-chlorophenyl)pyrazole] |
| (Cp-35) | —CHCONH—phenyl, COCH$_3$ |
| (Cp-36) | —CHCONH—naphthyl, COCH$_3$ |

The novel tetrakisazo compounds according to the present invention can be easily produced using known reactions. For example, the tetrakisazo compounds represented by the general formula [2] can be synthesized according to the process given below.

A compound of the general formula [3] given below wherein $R^7$ represents hydrogen is nitrated under suitable conditions, for example, in concentrated sulfuric acid using concentrated nitric acid, potassium nitrate, etc. into a compound of the general formula [3] wherein $R^7$ is $NO_2$. Then this is reduced under suitable conditions, for example, with iron powder and dilute hydrochloric acid or stannous chloride and hydrochloric acid into a compound of the general formula [3] wherein $R^7$ is $NH_2$. Then after this compound is diazonized in a common manner into a tetrakisazonium salt of the general formula [3] wherein $R^7$ is $N_2^\oplus Q^\ominus$ in which $Q^\ominus$ represents an anionic functional group such as $BF_4^\ominus$, $ClO_4^\ominus$ etc., which is then isolated subjected to a coupling reaction with each of the coupler residues (e.g., a naphthol AS type coupler, etc.) in a suitable solvent such as N,N-dimethylformamide in the presence of an alkali such as sodium acetate or sodium hydroxide.

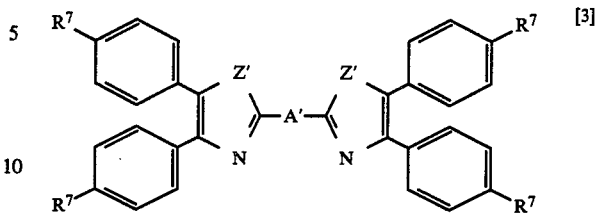

[3]

wherein A' and Z' have the same meanings as those defined for A' and Z' of the general formula [2].

Compounds of the general formula [3] wherein $R^7$ represents hydrogen can be easily synthesized, if Z' represents an oxygen atom, according for example to the method described in J. Heinze and H. Baumgartel, Chem. Ber., 103, 1572 (1970), if Z' represents a nitrogen atom, according for example to the synthesis method described in A. H. Cook and D. G. Jones, J. Chem. Soc., 1941, 278, or if Z' represents a sulfur atom or a selenium atom, according for example to the synthesis methods described in J. Heinze, et al., Chem. Ber., 103, 1572 (1970), P. Karrer and F. Forster, Helv. Chim. Acta, 28, 315 (1946), and G. Hofmann, Jus. Liebigs Ann. Chem., 250, 294 (1889).

SYNTHESIS EXAMPLE 1

[Synthesis of a tetrakisazo compound of the general formula [2] wherein A' is a single bond, Z' represents a sulfur atom, and Cp' represents No. (Cp-1)]

10 g (0.021 mol) of 4,4',5,5'-tetraphenyl-dithiazolyl-2,2' was dissolved in 100 ml of concentrated sulfuric acid, and the solution was ice-cooled. 9.4 g (0.093 mol) of potassium nitrate was gradually added thereto. The reaction temperature was kept to up to 50° C. After the completion of the addition, the reaction mixture was stirred for 3 hours with being ice-cooled, then was poured into 2 liter of ice-water, and the resulting yellow precipitate was filtered and washed with water and then ethanol to obtain 13.0 g (94% of the theoretical yield) 4,4',5,5'-tetrakis(p-nitrophenyl)-dithiazolyl-2,2'.

10 g (0.015 mol) of this 4,4',5,5'-tetrakis(p-nitrophenyl)-dithiazolyl-2,2' was mixed with 500 ml of N,N-dimethylformamide and 20 g of iron powder. To this liquid mixture were added 10 ml of concentrated hydrochloric acid and 30 ml of water, and the mixture was heated to 100° C. with well stirring. After one hour, while keeping the reaction temperature at 100° C., the mixture was neutralized with a saturated aqueous sodium hydrogencarbonate solution to bring the pH to 8, and the reaction mixture was filtered while it was hot. The filtrate was poured into 3 liter of ice-water, and the resulting pale yellow precipitate of 4,4',5,5'-tetrakis(p-aminophenyl)dithiazolyl-2,2' was filtered and dried. The yield was 7.6 g (93% of the theoretical yield).

5.32 g (0.01 mol) of the 4,4',5,5'-tetrakis(p-aminophenyl)-dithiazolyl-2,2' was added to dilute hydrochloric acid prepared from 20 ml of concentrated hydrochloric acid and 60 ml of water, and after the mixture was stirred on a water bath heated to 60° C., the mixture was cooled to 0° C., and a solution of 3.0 g of sodium nitrite in 20 ml of water was added dropwise to the mixture at 0° C. over about 30 minutes. Thereafter the mixture was stirred for 1 hour at the same temperature, then after a small amount of the unreacted matters were filtered off, 20 ml of 42% borofluoric acid was added to the filtrate, and the deposited crystals were filtered. After the crystals were washed with a small amount of water, the crystals were dried to obtain 8.65 g (93% of the theoretical yield) of brown crystals of a tetrakis-diazonium salt.

2 g (2.16 mmol) of the thus obtained tetrakis-diazonium salt and 2.27 g (8.62 mmol) of 2-hydroxy-3-naphthoic acid anilide (No. Cp-1 in Table 1) as a coupler were dissolved in 100 ml of N,N-dimethylformamide, and the mixture was cooled to 0° C. 10 ml of an aqueous 10% sodium acetate solution was added dropwise to this solution at 0° C., and the mixture was stirred for 2 hours at room temperature.

Then the obtained precipitate was filtered, washed with 300 ml of water and then 200 ml of acetone, then dried to obtain 3.12 g (90% of the theoretical yield) of the tetrakisazo compound.

The decomposition temperature of this compound was 270° C. or more.

The values of the elemental analysis and the absorption spectrum were as follows:

| | Elemental Analysis: | | | |
|---|---|---|---|---|
| | % C | % H | % N | % S |
| Calculated | 71.81 | 4.02 | 12.21 | 3.99 |
| Found | 72.10 | 4.03 | 12.13 | 3.90 |
| (for $C_{96}H_{64}N_{14}O_8S_2$) | | | | |

IR Absorption Spectrum: (KBr tablet method) The absorption spectrum is shown in FIG. 1. Absorption of the amido: 1670 cm$^{-1}$.

Visible Absorption Spectrum: Absorption maximum wavelength: 550 nm (in N,N-dimethylformamide containing 5% ethylenediamine).

SYNTHESIS EXAMPLES 2-12

The procedure was the same as in Synthesis Example 1, with the exception that instead of the coupler No. (Cp-1) in Synthesis Example 1, couplers given in Table 2 were used, to synthesize tetrakisazo compounds of the general formula [2] wherein A' is a single bond, and Z' represents a sulfur atom. The decomposition temperatures, IR absorption spectra (amido absorption values, KBr tablet method) and the visible absorption spectra (the absorption maximum wavelength values, in N,N-dimethylformamide containing 5% ethylenediamine) of them are given in Table 2.

TABLE 2

| Synthesis Example | No. of Cp' | Decomposition Temperature | IR Absorption Spectrum | Visible Absorption Spectrum |
|---|---|---|---|---|
| 2 | Cp-2 | 270° C. or more | 1670 cm$^{-1}$ | 560 nm |
| 3 | Cp-3 | " | 1670 cm$^{-1}$ | 550 nm |
| 4 | Cp-4 | " | 1675 cm$^{-1}$ | 553 nm |
| 5 | Cp-10 | " | 1670 cm$^{-1}$ | 555 nm |
| 6 | Cp-12 | " | 1675 cm$^{-1}$ | 555 nm |
| 7 | Cp-17 | " | 1675 cm$^{-1}$ | 555 nm |
| 8 | Cp-18 | " | 1675 cm$^{-1}$ | 550 nm |
| 9 | Cp-19 | " | 1670 cm$^{-1}$ | 560 nm |
| 10 | Cp-21 | " | 1670 cm$^{-1}$ | 575 nm |
| 11 | Cp-22 | " | 1670 cm$^{-1}$ | 577 nm |
| 12 | Cp-28 | " | 1660 cm$^{-1}$ | 550 nm |

SYNTHESIS EXAMPLE 13

[Synthesis of a tetrakisazo compound having the general formula [2] wherein A' represents

Z' represents a sulfur atom, and Cp' is No. (Cp-1)]

The first step of Synthesis Example 1 was repeated, with the exception that instead of 4,4',5,5'-tetraphenyl-dithiazolyl-2,2' was used 1,4-bis-(4',5'-diphenylthiazolyl-2')-benzene to obtain a tetrakisdiazonium salt. Then 2 g (1.99 mmol) of the obtained tetrakisdiazonium salt and 1.57 g (5.97 mmol) of 2-hydroxy-3-naphthoic acid anilide (Cp-1) as a coupler were dissolved in 100 ml N,N'-dimethylformamide, and the mixture was cooled to 0° C. To this solution was added dropwise 10 ml of a 10% aqueous sodium acetate solution at 0° C., and then the mixture was stirred for 2 hours at room temperature.

Then the produced precipitate was filtered, washed with 300 ml of water and then 200 ml of acetone, and dried to obtain 2.88 g (87% of the theoretical yield) of the tetrakisazo compound.

The decomposition temperature of this compound was 270° C. or more.

The values of the elemental analysis and the absorption spectrum were as follows:

| | Elemental Analysis: | | | |
|---|---|---|---|---|
| | % C | % H | % N | % S |
| Calculated: | 72.84 | 4.08 | 11.66 | 3.81 |
| Found | 72.95 | 4.39 | 11.38 | 3.77 |
| (for $C_{102}H_{68}N_{14}O_8S_2$) | | | | |

Figure 2:
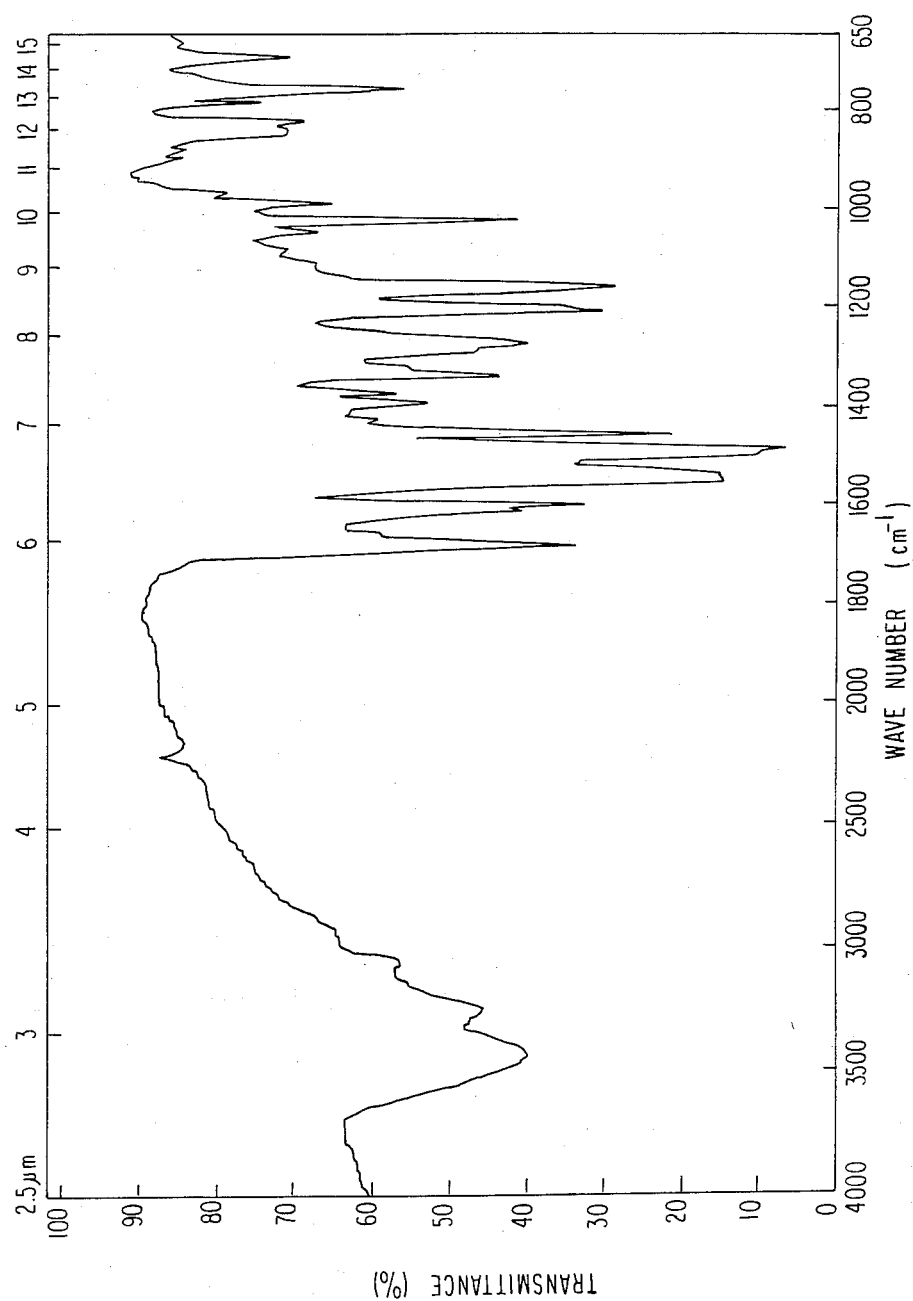
FIG. 2 shows the IR absorption spectrum of the tetrakisazo compound (the compound synthesized in Synthesis Example 13) accoding to the present invention.

IR Absorption Spectrum: (KBr tablet method) The absorption spectrum is shown in FIG. 2. The spectrum of the amido: 1680 cm$^{-1}$.

Visible Absorption Spectrum: Absorption maximum wavelength: 545 nm (in N,N-dimethylformamide containing 5% ethylenediamine).

SYNTHESIS EXAMPLES 14-24

The procedure was the same as in Synthesis Example 13, with the exception that instead of coupler No. (Cp-1) in Synthesis Example 13 were used couplers shown in Table 3 to synthesize tetrakisazo compounds having the general formula [2] wherein A' represents

and Z' represents a sulfur atom. The decomposition temperatures, the IR absorption spectra (absorption values of the amido, KBr tablet method) and the visible absorption spectra (absorption maximum wavelength values, in N,N-dimethylformamide containing 5% ethylenediamine) of the tetrakisazo compounds are given in Table 3.

TABLE 3

| Synthesis Example | No. of Cp' | Decomposition Temperature | IR Absorption Spectrum | Visible Absorption Spectrum |
|---|---|---|---|---|
| 14 | Cp-2 | 270° C. or more | 1675 cm$^{-1}$ | 555 nm |
| 15 | Cp-3 | " | 1670 cm$^{-1}$ | 550 nm |
| 16 | Cp-4 | " | 1670 cm$^{-1}$ | 540 nm |

TABLE 3-continued

| Synthesis Example | No. of Cp' | Decomposition Temperature | IR Absorption Spectrum | Visible Absorption Spectrum |
|---|---|---|---|---|
| 17 | Cp-10 | " | 1670 cm$^{-1}$ | 546 nm |
| 18 | Cp-12 | " | 1670 cm$^{-1}$ | 550 nm |
| 19 | Cp-17 | " | 1675 cm$^{-1}$ | 550 nm |
| 20 | Cp-18 | " | 1675 cm$^{-1}$ | 545 nm |
| 21 | Cp-19 | " | 1680 cm$^{-1}$ | 553 nm |
| 22 | Cp-21 | " | 1670 cm$^{-1}$ | 564 nm |
| 23 | Cp-22 | " | 1670 cm$^{-1}$ | 560 nm |
| 24 | Cp-28 | " | 1665 cm$^{-1}$ | 550 nm |

Other tetrakisazo compounds can be synthesized according to the above described synthesis examples by changing the coupler and the corresponding tetrakisdiazonium salt.

The electrophotographic light-sensitive material of the present invention has an electrophotographic light-sensitive layer containing one or more of the tetrakisazo compounds represented by the above described general formula (1). Electrophotographic light-sensitive materials having various constructions have been known, and the electrophotographic light-sensitive material of the present invention may be applied to any conventional structure for a light-sensitive material. However, it generally has a structure in which (a) an electrophotographic light-sensitive layer comprising a tetrakisazo compound dispersed in a binder or an electric charge carrier transporting medium is provided on an electrically conductive support; or (b) an electric charge carrier generating layer comprising a tetrakisazo compound as a main component is provided on an electrically conductive support and an electric charge carrier transporting medium layer is provided on the electric charge carrier generating layer.

The tetrakisazo compounds of the present invention act as photoconductive substances, and they generate an electric charge carrier with a very high efficiency when they absorb light. Though the generated electric charge carrier can be transported using the tetrakisazo compound as a medium, it is more effective to effect charge carrier transport using an electric charge carrier transporting compound as a medium.

In order to produce an electrophotographic light-sensitive material of type (a), fine particles of a tetrakisazo compound are dispersed in a solution of a binder or a solution prepared by dissolving an electric charge carrier transporting compound and a binder, and the resulting dispersion is applied to an electrically conductive support and dried. In this case, the electrophotographic light-sensitive layer is preferred to have a thickness of about 3 to 30μ and preferably about 5 to 20μ.

In order to produce an electrophotographic light-sensitive material of type (b), a tetrakisazo compound is applied to an electrically conductive support by vacuum evaporation or by applying a solution prepared by dissolving it in a solvent such as amine, or by applying a dispersion prepared by dispersing fine particles of the tetrakisazo compound in a suitable solvent containing, if desired, a binder dissolved therein, and drying, and thereafter, a solution containing an electric charge carrier transporting compound and a binder is applied to the resulting layer and drying. In this case, the tetrakisazo compound layer which is the electric charge carrier generating layer is preferred to have a thickness of about 4μ or less and preferably about 2μ or less and the electric charge carrier transporting medium layer is preferred to have a thickness of about 3 to 30μ and preferably about 5 to 20μ.

The tetrakisazo compounds used for the light-sensitive material of types (a) and (b) are powdered by means of a conventional dispersing apparatus such as a ball mill, a sand mill or a vibration mill, etc., to a particle size of about 5μ or less and preferably about 2μ or less.

If the amount of the tetrakisazo compound used in the electrophotographic light-sensitive material of type (a) is too small, sensitivity deteriorates. If it is too large, the electrification properties deteriorate or strength of the electrophotographic light-sensitive layer becomes poor. Accordingly, the amount of the tetrakisazo compound in the electrophotographic light-sensitive layer is preferred to be in a range of about 0.01 to 2 times by weight, preferably, about 0.05 to 1 time by weight, based on the binder. The amount of the electric charge carrier transporting compound optionally added is preferred to be in a range of about 0.1 to 2 times by weight, preferably, about 0.3 to 1.3 times by weight, based on the binder. When an electric charge carrier transporting compound capable of acting as a binder is used, the amount of the tetrakisazo compound added is preferred to be in a range of about 0.01 to 0.5 time by weight based on the binder.

In an embodiment of the present invention having an electric charge carrier generating layer containing a tetrakisazo compound in the electrophotographic light-sensitive material of type (b), the amount of the tetrakisazo compound used is preferred to be about 0.1 time by wieght or more based on the binder resin. If the amount used is less than the above described range, sufficient sensitivity is not obtained. The amount of the electric charge carrier transporting compound in the electric charge carrier transporting medium is preferred in a range of about 0.2 to 2 times by weight, preferably about 0.2 to 1.3 times by weight, based on the weight of the binder. When using a high polymer electric charge carrier transporting compound capable of functioning as a binder, an additional binder is not required.

In light-sensitive materials of type (b), electric charge carrier transporting compounds such as hydrazone compounds and oxime compounds can be added in the electric charge carrier generating layer as described in Japanese Patent Application Nos. 53183/1984, 109906/1984 and 118414/1984.

In producing the electrophotographic light-sensitive material of the present invention, conventional additives such as a plasticizer or a sensitizer may be used together with the binder.

The electrically conductive support used for the electrophotographic light-sensitive material of the present invention can include any conventional support known in the art, including plates of metal such as aluminum, copper or zinc, plastic sheets or plastic films such as those of polyester, to which an electrically conductive material such as aluminum, indium oxide or SnO$_2$ is applied by vacuum evaporation or by application of a dispersion, and paper which is processed so as to have an electrically conductive property.

As binders, electrically insulating film forming high polymers which are hydrophobic and have a high dielectric constant are suitably used, including the following examples which are not to be construed as limiting the scope of the invention:

Polycarbonate, polyester, polyester carbonate, methacrylic resin, acrylic resin, polyvinyl chloride, polyvinylidene chloride, polystyrene, polyvinyl acetate, styrene-butadiene copolymer, vinylidene chloride-acrylonitrile copolymer, vinyl chloride-vinyl acetate copolymer, vinyl chloride-vinyl acetate-maleic anhydride terpolymer, silicone resin, silicone-alkyd resin, phenolformaldehyde resin, styrene-alkyd resin, and poly-N-vinylcarbazole.

These binders can be used alone or as a mixture of two or more thereof.

Suitable plasticizers which can be used include biphenyl, chlorinated biphenyl, o-terphenyl, p-terphenyl, dibutyl phthalate, dimethylglycol phthalate, dioctyl phthalate, triphenyl phosphate, methylnaphthalene, benzophenone, chlorinated paraffin, polypropylene, polystyrene, dilaurylthiodipropionate, 3,5-dinitrosalicylic acid, and various fluorohydrocarbons.

In addition, in order to improve the surface properties of the electrophotographic light-sensitive material, silicone oil may be added.

Useful sensitizing agents include chloranil, tetracyanoethylene, Methyl Violet, Rhodamine B, cyanine dyes, merocyanine dyes, pyrylium dyes and thiapyrylium dyes.

Electric charge carrier transporting compounds are generally classified either as compounds which transport an electron or as compounds which transport a hole. Both can be used for the electrophotographic light-sensitive material of the present invention. Compounds which transport an electron include compounds having an electron attractive group, for example, 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole chloranil, 2,3-dichloro-5,6-dicyanobenzoquinone, 2,4,7-trinitro-9,10-phenanthrenequinone, tetrachlorophthalic anhydride, tetracyanoethylene and tetracyanoquinodimethane.

Compounds which transport a hole include compounds having an electron donative group, for example, high polymers such as (1) Polyvinyl carbazole and derivatives thereof described in Japanese Patent Publication No. 10966/59, (2) Vinyl polymers such as polyvinyl pyrene, polyvinyl anthracene, poly-2-vinyl-4-(4'-dimethylaminophenyl)-5-phenyloxazole or poly-3-vinyl-N-ethylcarbazole, described in Japanese Patent Publication Nos. 18674/68 (U.S. Pat. No. 3,232,755) and 19192/68 (U.S. Pat. No. 3,162,532), (3) Polymers such as polyacenaphthylene, polyindene or acenaphthylene-styrene copolymer described in Japanese Patent Publication No. 19193/68 (U.S. Pat. No. 3,169,060), (4) Condensation resins such as pyrene-formaldehyde resin, bromopyrene-formaldehyde resin or ethylcarbazole-formaldehyde resin described in Japanese Patent Publication No. 13940/81 (U.S. Pat. Nos. 3,842,038 and 3,881,922), or (5) Various triphenylmethane polymers described in Japanese Patent Application (OPI) Nos. 90883/81 and 161550/81; and low molecular weight compounds such as (6) Triazole derivatives described in U.S. Pat. No. 3,112,197, (7) Oxadiazole derivatives described in U.S. Pat. No. 3,189,447, (8) Imidazole derivatives described in Japanese Patent Publication No. 16096/62, (9) Polyarylalkane derivatives described in U.S. Pat. Nos. 3,615,402, 3,820,989 and 3,542,544, Japanese Patent Publication Nos. 555/70 (U.S. Pat. No. 3,542,547) and 10983/76 (U.S. Pat. No. 3,963,799), and Japanese Patent Application (OPI) Nos. 93224/76 (U.S. Pat. No. 4,127,412), 108667/80, 156953/80 and 36656/81,

(10) Pyrazoline derivatives and pyrazolone derivatives described in U.S. Pat. Nos. 3,180,729 and 4,278,746 and Japanese Patent Application (OPI) Nos. 88064/80, 88065/80, 105537/74 (U.S. Pat. No. 3,837,851), 51086/80, 80051/81, 88141/81, 45545/82, 112637/79 and 74546/80,

(11) Phenylenediamine derivatives described in U.S. Pat. No. 3,615,404, Japanese Patent Publication No. 10105/76, Japanese Patent Application (OPI) Nos. 83435/79, 110836/79 and 119925/79, and Japanese Patent Publication Nos. 3712/71 and 28336/72,

(12) Arylamine derivatives described in U.S. Pat. No. 3,567,450, Japanese Patent Publication No. 35702/74, West German Patent (DAS) No. 1,110,518, U.S. Pat. Nos. 3,180,703, 3,240,597, 3,658,520, 4,232,103, 4,175,961 and 4,012,376, Japanese Patent Application (OPI) No. 22437/81,

(13) Amino substituted chalcone derivatives described in U.S. Pat. No. 3,526,501,

(14) N,N-bicarbazyl derivatives described in U.S. Pat. No. 3,542,546,

(15) Oxazole derivatives described in U.S. Pat. No. 3,257,203,

(16) Styrylanthracene derivatives described in Japanese Patent Application (OPI) No. 46234/81,

(17) Fluorenone derivatives described in Japanese Patent Application (OPI) No. 110837/79, and

(18) Hydrazone derivatives described in U.S. Pat. No. 3,717,462, Japanese Patent Application (OPI) Nos. 59143/79 (corresponding to U.S. Pat. No. 4,150,987), 52063/80 (U.S. Pat. No. 4,338,388), 52064/80, 46760/80, 85495/80, 11350/82, 148749/82 and 104144/82.

In the present invention, the electric charge carrier transporting compounds are not limited to compounds described in (1) to (18), and any known electric charge carrier transporting compounds can be used.

These electric charge transporting substances can be used alone or in an optional combination of two or more of them.

In the light-sensitive material obtained as described above, an adhesive layer or a barrier layer can be provided, if desired, between the electrically conductive support and the light-sensitive layer. Materials used for these layers include gelatin, casein, polyvinyl alcohol, ethyl cellulose, carboxymethyl cellulose, the vinylidene chloride type polymer latex described in Japanese Patent Application (OPI) No. 84247/82, the styrene-butadiene type polymer latex described in Japanese Patent Application (OPI) No. 114544/82, and aluminum oxide, as well as the above described high polymers used as the binders. These layers are preferred to have a thickness of about 1 $\mu$m or less.

The electrophotographic light-sensitive materials of the present invention generally have high sensitivity and excellent durability.

The electrophotographic light-sensitive material of the present invention can be applied to not only electrophotographic copying machines but also in the field of light-sensitive materials for printers using a laser or Braun tube as a light source, and the like.

The photoconductive composition containing the tetrakisazo compound of the present invention can be used as a photoconductive layer in a video camera tube or as a photoconductive layer in solid camera elements having a light receiving layer (photoconductive layer) which is provided on the entire face of a one-dimensionally or two-dimensionally arranged semiconductor circuit for carrying out signal transfer or scanning. Further, it can be used as a photoconductive layer in solar cells as described in A. K. Ghosh, Tom Feng, *J. Appl. Phys.*, 49(12), p. 5982 (1978).

The tetrakisazo compounds of the present invention can be used as photoconductive coloring particles in a light-electrophoresis system or as coloring particles in a dry type or wet type electrophotographic developer.

When the tetrakisazo compound of the present invention is dispersed in a solution of an alkali soluble resin such as a phenol resin together with the above described electric charge carrier transporting compounds such as oxadiazole derivatives or hydrazone derivatives, and the dispersion is applied to an electrically conductive support such as aluminum and dried, a printing plate having high resolving power, high durability and high sensitivity can be obtained by carrying out imagewise exposure, toner development and etching with an aqueous solution of alkali, as described in Japanese Patent Publication No. 17162/62 and Japanese Patent Application (OPI) Nos. 19063/80, 161250/80 and 147656/82. Printed circuits can be produced in the same manner.

Now examples wherein the present light-sensitive compositions are used as optical information recording mediums will be described.

The present optical information recording mediums can be formed by forming an organic thin film containing at least a tetrakisazo compound according to the present invention on a support, which organic thin film can be formed using said compound by various methods such as vacuum deposition, coating, etc.

When coating technique is applied, as the organic solvent can be used alcohols (e.g., methanol, ethanol, isopropanol, etc.), ketones (e.g., acetone, methyl ethyl ketone, methyl isobutyl ketone, cyclohexanone, etc.), amides (e.g., N,N-dimethylformamide, N,N-dimethylacetamide, etc.), esters (e.g. methyl acetate, ethyl acetate, butyl acetate, etc.), ethers (e.g. tetrahydrofuran, dioxane, monoglyme, diglyme, etc.), halogenated hydrocarbons (e.g., methylene chloride, chloroform, methylchloroform, carbon tetrachloride, monochlorobenzene, dichlorobenzene, etc.), etc. that can be used alone or in the form of mixtures. As a binder for said dyes can be one selected from known natural or synthetic resins for example cellulosic resins (e.g., nitrocellulose, cellulose phosphate, cellulose acetate, cellulose butyrate, methyl cellulose, ethyl cellulose, butyl cellulose, etc.), (meth)acrylic resins (e.g., polymethyl methacrylate, polybutyl methacrylate, polybutyl acrylate, polymethacrylic acid, polyacrylamide, polymethacrylamide, polyacrylonitrile, etc.), vinyl resins (e.g., polystyrene, polyvinyl acetate, polyvinyl chloride, polyvinyl alcohol, polyvinyl pyrrolydone, etc.), polycarbonates, polyesters, polyamide resins, epoxy resins, phenolic resins, polyolefin resins (e.g., polyethylene, polypropylene, etc.) or synthesized copolymer resins, etc. The coating can be effected by the conventional coating method such as spraying, roller coating, spinner coating, blade coating, etc.

In case that the organic thin film is formed together with a resin, the content of the tetrakisazo compound is about 5 to 90 wt% and preferably about 15 to 80 wt% and the remainder is the binder. The deposited film thickness or dried film thickness of the organic thin film is up to about 10 μm and preferably up to about 2 μm.

If required, a discoloration preventing agent and a coloring agent are contained additionally in the organic thin film.

The material of the support used in the present invention is known to those skilled in the art and may be transparent or opaque to the laser beam used. Examples of the material include glass, quartz, ceramics, paper, metals, plastics (e.g., acrylic resins, methacrylic resins, polyester resins, polyolefin resins, polystyrene resins, polyamide resins, polycarbonate resins, etc.), etc.

When writing recording is effected by radiating a laser beam from the support side, the material should be transparent to the laser beam, and on the other hand, when writing recording is effected from the side opposite to the support, that is, from the surface of the recording layer, the material is not required to be transparent to the laser beam. However, when reading reproducing is effected by the transmitted light, the material should be transparent to the reading laser beam. On the other hand, when reading reproducing is effected by the reflected light, the material may be transparent or opaque to the reading laser beam. Further, if required, the support may be provided with profiled guide groove means, or a subbing layer for example of an ultraviolet light curing resin or the like.

Although the optical information recording medium of the present invention comprises basically an organic thin film provided on the support mentioned above, the medium, if required, is further provided with a reflective layer such as a laminated layer or a deposited layer of a reflective metal such as aluminium, silver, chromium, tin, etc. between the support and the organic thin layer.

Recording of information can be carried out by forming pits in the organic thin film by the effect of heat resulted from the laser beam converged on the organic thin film. When the depth of pits is made the same as the thickness of the organic thin film, the reflectance in the region of pits can be increased. Reproduction of information uses a laser beam that has the same wavelength as that of the laser beam used in the writing but is lower in intensity than that of the laser beam used in the writing, so that the reading light is reflected greatly at the pitted region but is absorbed at the non-pitted region whereby the reproduction is carried out by detecting the difference between the reflected lights at the pitted region and the non-pitted region. Further, in another method, real time recording is carried out using a laser beam having a first wavelength capable of being absorbed in the organic thin film, and reproduction is carried out using a laser beam having a second wavelength capable of substantially being transmitted into the organic thin film. The reproduction is carried out in such a way that the reproducing laser beam responds to the change in reflectance caused by the difference of the thickness at the pitted region and the non-pitted region.

A recording medium comprising two recording media having the same constitution as mentioned above that are arranged with the organic thin films opposed to each other can also be used.

In this case, since the organic thin films are shielded from the outer atmosphere, and they are protected from adhesion of foreign materials, marring and contact with harmful gases, the storability of the recording layers is improved remarkably.

As the laser beam that can be applied in the optical information recording material of the present invention can be used gas lasers such as Ar laser beam, He-Ne laser beam, He-Cd laser beam, etc.

The present invention is illustrated in greater detail by reference to the following examples, but the present invention is not restricted to the examples. In the examples, unless otherwise indicated all parts, percents and ratios are by weight.

EXAMPLE 1

1 part of a tetrakisazo compound represented by general formula (2) wherein A' is a single bond, Z' is a sulfur atom, and Cp' is No. (Cp-1) in Table 1, which was synthesized in Synthesis Example 1, 5 parts of 4,4'-bis(-diethylamino)-2,2'-dimethyltriphenylmethane and 5 parts of polycarbonate of bisphenol A were added to 95 parts of dichloromethane. The mixture was mixed in a ball mill to prepare a coating solution. It was applied to an electrically conductive transparent support (produced by providing a vacuum evaporation film of indium oxide on the surface of a 100 μm polyethylene terephthalate film of surface resistance: $10^3\Omega$) by a wire round rod, and dried to prepare an electrophotographic light-sensitive material having a monolayer type electrophotographic light-sensitive layer having a thickness of about 8 μm.

This electrophotographic light-sensitive material was electrified to +400 V by a corona discharge of +5 KV using a testing apparatus for electrostatic copying paper (type SP-428, produced by Kawaguchi Denki Co.), and it was then exposed to light with a tungsten lamp of a color temperature of 2,854° K. to produce an exposure of 4 luxes at the surface. The time necessary to reduce the surface electric potential to half of the initial surface electric potential was measured, and the half decay exposure amount $E_{50}$ (lux.sec) was determined to be 3.1 lux.sec.

EXAMPLES 2 TO 31

Electrophotographic light-sensitive materials having a monolayer structure were produced in the same manner as in Example 1 except that tetrakisazo compounds shown in Table 4 were used instead of the tetrakisazo compound synthesized in Synthesis Example 1, and the half decay exposure amount $E_{50}$ by positive electrification was determined in the same manner as in Example 1. The results obtained are shown in Table 4.

TABLE 4

| Example No. | Tetrakisazo Compound [2] A' | Z' | Cp' | $E_{50}$ (lux · sec) |
|---|---|---|---|---|
| 2 | single bond | O | Cp-2 | 4.0 |
| 3 | single bond | O | Cp-5 | 3.8 |
| 4 | single bond | S | Cp-8 | 4.6 |
| 5 | single bond | S | Cp-12 | 2.9 |
| 6 | single bond | NH | Cp-3 | 2.7 |
| 7 | single bond | NH | Cp-9 | 3.1 |
| 8 | single bond | Se | Cp-4 | 4.3 |
| 9 | single bond | Se | Cp-10 | 4.0 |
| 10 | —CH=CH— | O | Cp-1 | 2.8 |
| 11 | —CH=CH— | O | Cp-7 | 3.4 |
| 12 | —CH=CH— | S | Cp-5 | 4.5 |
| 13 | —CH=CH— | S | Cp-20 | 2.9 |
| 14 | —CH=CH— | N(CH3) | Cp-4 | 3.5 |
| 15 | —CH=CH— | N(CH3) | Cp-26 | 4.3 |
| 16 | —CH=CH— | Se | Cp-2 | 3.7 |
| 17 | —CH=CH— | Se | Cp-17 | 3.6 |
| 18 | phenylene | O | Cp-1 | 2.9 |
| 19 | phenylene | O | Cp-3 | 3.3 |
| 20 | phenylene | S | Cp-2 | 4.2 |
| 21 | phenylene | S | Cp-10 | 3.9 |
| 22 | phenylene | N(C2H5) | Cp-5 | 4.1 |
| 23 | phenylene | N(C2H5) | Cp-9 | 4.6 |
| 24 | phenylene | Se | Cp-6 | 3.7 |
| 25 | phenylene | Se | Cp-18 | 4.0 |
| 26 | biphenylene | O | Cp-3 | 3.8 |
| 27 | biphenylene | O | Cp-14 | 4.2 |
| 28 | biphenylene | S | Cp-7 | 2.9 |
| 29 | biphenylene | S | Cp-12 | 3.5 |
| 30 | biphenylene | N(ph) | Cp-2 | 4.9 |
| 31 | biphenylene | Se | Cp-8 | 4.3 |

EXAMPLE 32

After 5 parts of a tetrakisazo compound represented by the general formula [2] wherein A' is a single bond, Z' is a sulfur atom, and Cp' is No. (Cp-1) in Table 1, which was synthesized in Synthesis Example 1, and 5 parts of polyester resin [trade name: Vylon 200 produced by Toyobo Co., Ltd.] were processed together with 50 parts of tetrahydrofuran by means of a ball mill for 20 hours, the resulting dispersion was applied to an electrically conductive support (produced by providing an aluminum vacuum evaporation layer on the surface of a 75 μm polyethylene terephthalate film of surface resistance: $4 \times 10^2\Omega$) using a wire round rod, and dried to produce an electric charge generating layer having a thickness of 0.5 μm.

Then, to the electric charge generating layer a solution prepared by dissolving 3.6 parts of p-(diphenylamino)benzaldehyde N'-methyl-N'-phenylhydrazone (as described in Japanese Patent Application (OPI) No. 85495/82) having the following formula:

synthesized in Synthesis Example 1 and used in Example 32, disazo compounds having the structure (I) and (II) given below were used to prepare electrophotographic light-sensitive materials having two layers, and as in Example 32, the initial surface electric potential $V_0$, the half decay exposure amount $E_{50}$ and the residual electric potential $V_R$ were determined. Further, as in Example 32, they were repeated 3000 times and the results are given in Table 6.

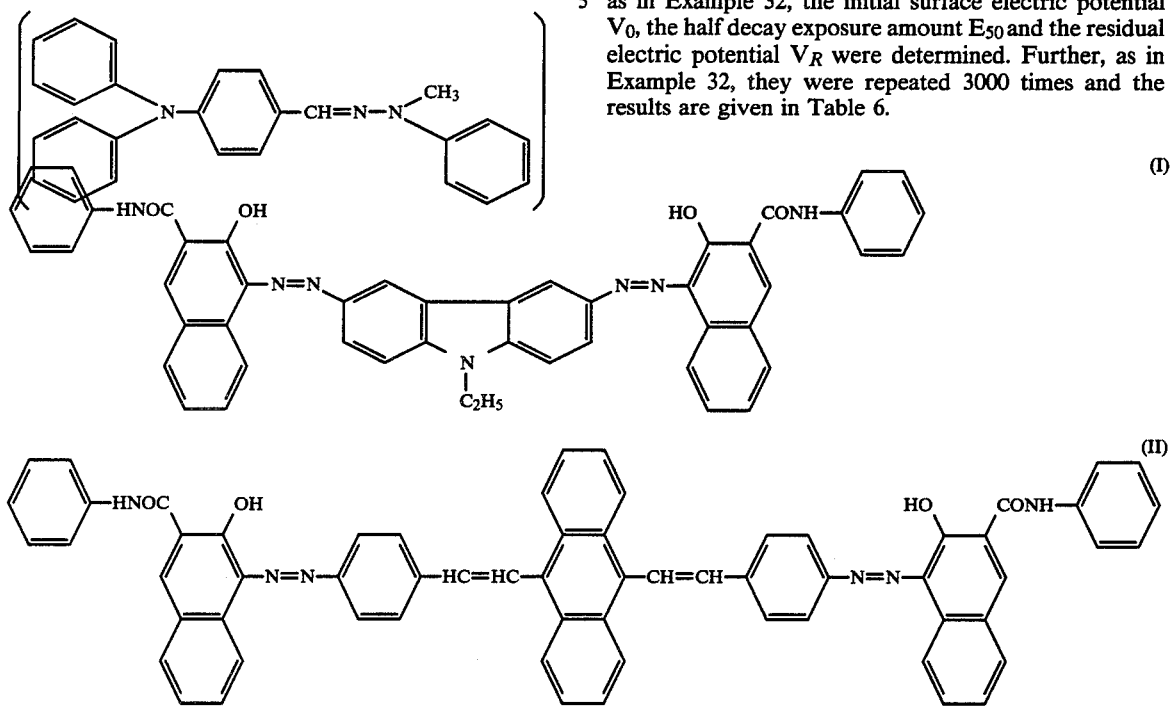

and 4 parts of polycarbonate of bisphenol A in a mixture of 13.3 parts of dichloromethane and 26.6 parts of 1,2-dichloroethane was applied by a wire round rod, and dried to form an electric charge transporting layer having a thickness of 11 μm. Thus, an electrophotographic light-sensitive material having a two-layer electrophotographic light-sensitive layer was produced.

The initial surface electric potential $V_0$ of the light-sensitive material when it was electrified by corona discharge of −6 KV for 5 seconds, the exposure amount $E_{50}$ necessary to reduce the surface electric potential to half of the initial surface electric potential $V_0$ when the light-sensitive material was exposed to light using a tungsten lamp providing an intensity of illumination of 30 luxes at the surface, and the surface electric potential (residual electric potential) $V_R$ when the material was exposed to light at an exposure amount of 60 lux.sec were measured.

This measurement was repeated 3,000 times, to obtain the results shown in Table 5.

TABLE 5

|  | The First Time | The 3,000th Time |
|---|---|---|
| $V_0$ (V) | −980 | −970 |
| $E_{50}$ (lux · sec) | 2.3 | 2.6 |
| $V_R$ (V) | 0 | −2 |

COMPARATIVE EXAMPLES 1-2

The procedure was the same as in Example 32, with the exception that instead of the tetrakisazo compound

TABLE 6

|  | Comparative Example 1 Disazo Compound (I) | | Comparative Example 2 Disazo Compound (II) | |
|---|---|---|---|---|
|  | The first Time | The 3,000th Time | The first Time | The 3,000th Time |
| $V_0$(V) | −950 | −710 | −850 | −660 |
| $E_{50}$ (lux · sec) | 11.4 | 15.3 | 9.6 | 14.7 |
| $V_R$ (V) | −40 | −83 | −35 | −69 |

EXAMPLES 33 TO 107

Electrophotographic light-sensitive materials having a two-layer structure were produced in the same manner as in Example 32, except that tetrakisazo compounds shown in Table 7 were used instead of the tetrakisazo compound synthesized in Synthesis Example 1, and the half decay exposure amount $E_{50}$ was determined in the same manner. The results are shown in Table 7.

TABLE 7

| Example No. | Tetrakisazo Compound [2] | | | $E_{50}$ (lux · sec) |
|---|---|---|---|---|
|  | A' | Z' | Cp' |  |
| 33 | single bond | O | Cp-1 | 3.3 |
| 34 | " | " | Cp-2 | 3.6 |
| 35 | " | " | Cp-3 | 2.8 |
| 36 | " | " | Cp-4 | 2.9 |
| 37 | " | S | Cp-2 | 3.1 |
| 38 | " | " | Cp-3 | 4.2 |
| 39 | " | " | Cp-4 | 2.3 |
| 40 | " | " | Cp-5 | 2.2 |
| 41 | " | " | Cp-10 | 1.9 |
| 42 | " | " | Cp-12 | 3.7 |
| 43 | " | " | Cp-17 | 4.2 |
| 44 | " | " | Cp-18 | 2.4 |
| 45 | " | " | Cp-19 | 2.8 |
| 46 | " | " | Cp-21 | 3.9 |

TABLE 7-continued

| Example No. | Tetrakisazo Compound [2] A' | Z' | Cp' | $E_{50}$ (lux · sec) |
|---|---|---|---|---|
| 47 | " | " | Cp-28 | 1.8 |
| 48 | " | NH | Cp-6 | 3.7 |
| 49 | " | " | Cp-7 | 3.4 |
| 50 | " | " | Cp-9 | 3.4 |
| 51 | " | Se | Cp-13 | 2.9 |
| 52 | " | " | Cp-14 | 3.3 |
| 53 | " | " | Cp-15 | 3.5 |
| 54 | —CH=CH— | O | Cp-1 | 2.9 |
| 55 | " | " | Cp-19 | 2.8 |
| 56 | " | " | Cp-29 | 3.3 |
| 57 | " | " | Cp-31 | 3.4 |
| 58 | " | S | Cp-2 | 2.8 |
| 59 | " | " | Cp-17 | 3.1 |
| 60 | " | " | Cp-21 | 3.2 |
| 61 | " | " | Cp-28 | 1.8 |
| 62 | " | " | Cp-32 | 3.0 |
| 63 | " | $N(CH_3)$ | Cp-2 | 3.4 |
| 64 | " | " | Cp-18 | 2.9 |
| 65 | " | " | Cp-22 | 2.7 |
| 66 | " | Se | Cp-4 | 3.0 |
| 67 | " | " | Cp-16 | 2.0 |
| 68 | " | " | Cp-27 | 1.8 |
| 69 |  | O | Cp-1 | 3.1 |
| 70 | " | " | Cp-3 | 3.9 |
| 71 | " | " | Cp-4 | 2.5 |
| 72 | " | " | Cp-5 | 2.2 |
| 73 | " | " | Cp-16 | 3.1 |
| 74 | " | " | Cp-21 | 3.4 |
| 75 | " | " | Cp-28 | 1.9 |
| 76 | " | " | Cp-31 | 2.4 |
| 77 | " | " | Cp-34 | 7.0 |
| 78 | " | S | Cp-1 | 2.1 |
| 79 | " | " | Cp-2 | 2.9 |
| 80 | " | " | Cp-3 | 4.5 |
| 81 | " | " | Cp-4 | 2.0 |
| 82 | " | " | Cp-10 | 1.9 |
| 83 | " | " | Cp-12 | 3.9 |
| 84 | " | " | Cp-17 | 3.7 |
| 85 | " | " | Cp-19 | 4.2 |
| 86 | " | " | Cp-22 | 3.8 |
| 87 | " | " | Cp-28 | 1.9 |
| 88 | " | $N(C_2H_5)$ | Cp-3 | 3.3 |
| 89 | " | " | Cp-6 | 2.9 |
| 90 | " | " | Cp-11 | 3.5 |
| 91 | " | Se | Cp-14 | 2.2 |
| 92 | " | " | C-15 | 3.1 |
| 93 | " | " | Cp-19 | 2.1 |
| 94 | 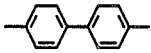 | O | Cp-2 | 3.0 |
| 95 | " | " | Cp-9 | 2.5 |
| 96 | " | " | Cp-13 | 3.1 |
| 97 | " | " | Cp-20 | 4.1 |
| 98 | " | S | Cp-1 | 2.2 |
| 99 | " | " | Cp-3 | 2.9 |
| 100 | " | " | Cp-8 | 1.9 |
| 101 | " | " | Cp-12 | 2.2 |
| 102 | " | " | Cp-22 | 3.0 |
| 103 | " | " | Cp-28 | 1.8 |
| 104 | " | N(ph) | Cp-4 | 2.7 |
| 105 | " | " | Cp-11 | 3.3 |
| 106 | " | Se | Cp-19 | 2.3 |
| 107 | " | " | Cp-30 | 3.7 |

As is clear from the above results, the electrophotographic light-sensitive materials of the present invention are quite excellent in sensitivity, residual surface electric potential, and stability when used repeatedly, in comparison with the comparative electrophotographic light-sensitive matrials.

EXAMPLE 108

5 parts of a tetrakisazo compound represented by the general formula [2] wherein A' is a single bond, Z' is a sulfur atom, and Cp' is No. (Cp-1) in Table 1, which was synthesized in Synthesis Example 1, 40 parts of the hydrozone compound used in Example 32 and 100 parts of benzyl methacrylate-methacrylic acid copolymer ($[\eta]$ 30° C. methyl ethyl ketone: 0.12, methacrylic acid content: 32.9%) were added to 600 parts of dichloromethane, and the mixture was subjected to ultrasonic dispersion.

The resulting dispersion was applied to a sand-dressed aluminum plate having a thickness of 0.25 mm, and dried to produce an electrophotographic light-sensitive printing plate material having an electrophotographic light-sensitive layer having a dry film thickness of 6 μm.

After the resulting sample was electrified in the dark by corona discharge (+6 KV) to a surface electric potential of the light-sensitive layer of about +600 V, it was exposed to tungsten light of a color temperature of 2,854° K. to an illumination of 2.0 luxes. The half decay exposure amount was 4.3 lux.sec.

After this sample was electrified in the dark to a surface electric potential of about +400 V, it was imagewise exposed in contact with a positive transparent original. It was dipped for 20 seconds in a liquid developer containing a toner prepared by adding 5 parts of finely divided granular polymethyl methacrylate (toner) and 0.01 part of lecithin of soybean oil in 1,000 parts of Isoper ® H (petroleum type solvent, Esso Standard Co.) to obtain a sharp positive toner image.

The toner image was fixed by heating to 100° C. for 30 seconds. This printing plate material was immersed for about 1 minute in a solution prepared by dissolving 70 parts of sodium metasilicate hydrate in a mixture of 140 parts of glycerine, 550 parts of ethylene glycol and 150 parts of ethanol. It was then washed with flowing water with gentle brushing to remove the part of the electrophotographic light-sensitive layer to which the toner did not adhere to produce a printing plate.

Alternatively, the electrostatic latent image was developed with a magnetic brush using a toner for Xerox ®3500 (produced by Fuji Xerox Co.) instead of the liquid developer and, thereafter, it was fixed by heating to 80° C. for 30 seconds. The part of the light-sensitive layer to which the toner did not adhere was then removed by immersion in a solution of alkali to produce a printing plate.

When printing was carried out by the conventional manner using the resulting printing plate by means of an offset printing machine: Hamadastar 600CD, 50,000 sheets of very clear print having no stain could be obtained.

EXAMPLE 109

10 g of nitrocellulose solution (25 wt% methyl ethyl ketone solution, produced by Daicel Chemical Industries, Ltd.), 3.0 g of the tetrakisazo compound synthesized in Synthesis Example 1, and 100 g of tetrahydrofuran were mixed, and dispersed well. After the dispersion was coated on an acrylic resin substrate by spinner coating method (1000 r.p.m.), it was dried for 2 hours at temperature of 80° C. (the thickness of the obtained film was 0.3 μm). The thus prepared recording medium was attached to a turn table, then while the turn table was rotated at 1800 r.p.m. by a motor, recording was carried out in such a way that a helium-neon laser beam (having an oscillation wavelength of 633 nm) with 10 mW and 8 MHz converged to a spot side of 1.0 μm was irradiated on the recording surface into pattern. When the surface of the recording layer where recording was done was observed by a scanning type electron microscope, clear pits was observed.

When the above laser beam at a lower output was irradiated on this recording medium, and the reflected light was detected, a waveform having an enough S/N ratio was obtained.

While the invention has been described in detail and with reference to specific embodiments thereof, it will be apparent to one skilled in the art that various changes and modifications can be made therein without departing from the spirit and scope thereof.

What is claimed is:

1. A light-sensitive composition containing at least one of tetrakisazo compounds having the following general formula [1]:

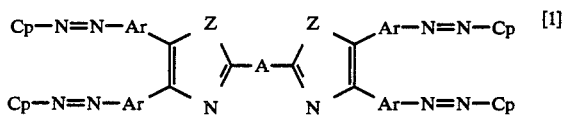

wherein Cp represents a coupler residue; A is a single bond,

in which n is an integer of from 1 to 3, or a divalent aromatic organic residue, and $B^1$ and $B^2$ each represents a hydrogen atom or an electron attractive group; Z represents

—O—, —S— or —Se—, in which $R^6$ represents a hydrogen atom, a substituted or unsubstituted lower alkyl group, a substituted or unsubstituted aryl group, a substituted or unsubstituted alkoxycarbonyl group, a substituted or unsubstituted aryloxycarbonyl group or a substituted or unsubstituted acyl group; and Ar represents a substituted or unsubstituted divalent aromatic carbon ring group or a substituted or unsubstituted divalent heterocyclic aromatic ring group.

2. A light-sensitive composition claimed in claim 1, wherein Cp represents a coupler residue selected from the following coupler constituents:

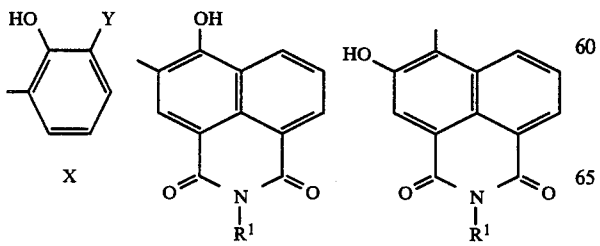

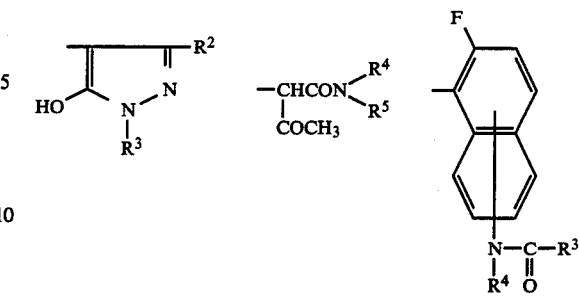

wherein

X represents a substituted or unsubstituted atomic group required for forming an aromatic ring or heterocyclic ring together by fusing with the benzene ring having a hydroxyl group and Y;

Y represents a hydrogen atom, —CONR$^4$R$^5$, —COOR$^4$, —CONHNR$^4$R$^5$, —CONHN═CH—R$^4$, or

$R^1$ represents a substituted or unsubstituted alkyl group or a substituted or unsubstituted phenyl group;

$R^2$ represents a hydrogen atom, a lower alkyl group, a carbamoyl group, a carboxyl group, an alkoxycarbonyl group, an aryloxycarbonyl group, or a substituted or unsubstituted amino group;

$R^3$ represents a substituted or unsubstituted alkyl group, a substituted or unsubstituted aromatic ring group, or a substituted or unsubstituted heterocyclic aromatic ring group; and $R^4$ and $R^5$ each represents a hydrogen atom or a substituted or unsubstituted alkyl group, a substituted or unsubstituted aromatic ring group, or a substituted or unsubstituted heterocyclic aromatic ring group.

3. A light-sensitive composition claimed in claim 1, wherein said tetrakisazo compound is represented by the following general formula [2]

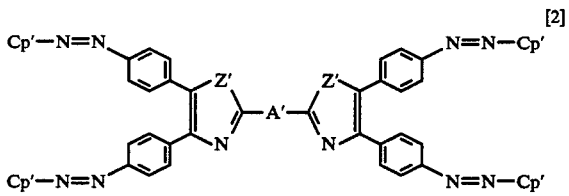

wherein A' represents a single bond, —CH═CH—,

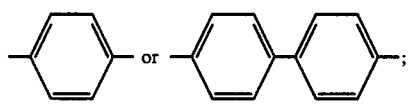

Z' represents —O—,

—S— or —Se—; and Cp' represents

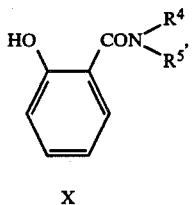

in which X represents an atomic group required for forming an aromatic ring or heterocyclic ring together by fusing with the benzene ring having a hydroxy group and

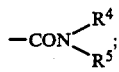

$R^4$ and $R^5$ each represents a hydrogen atom, a substituted or unsubstituted alkyl group, a substituted or unsubstituted aromatic ring group, or a substituted or unsubstituted heterocyclic aromatic ring group; and $R^6$ represents a hydrogen atom, a substituted or unsubstituted lower alkyl group, a substituted or unsubstituted aryl group, a substituted or unsubstituted alkoxycarbonyl group, a substituted or unsubstituted aryloxycarbonyl group or a substituted or unsubstituted acyl group.

4. An electrophotographic light-sensitive material comprising an electrically conductive support and a layer containing an electric charge carrier transporting compound and the tetrakisazo compound claimed in claim 1 as an electric charge carrier generating compound.

5. An electrophotographic light-sensitive material comprising an electrically conductive support, an electric charge carrier transporting layer containing an electric charge carrier transporting compound, and an electric charge carrier generating layer containing the tetrakisazo compound claimed in claim 1.

6. An electrophotographic light-sensitive material claimed in claim 4, wherein said layer further comprises a binder.

7. An electrophotographic light-sensitive material claimed in claim 5, wherein said electric charge carrier generating layer contains said tetrakisazo compound as a major component, and said electric charge carrier transporting layer is provided on said electric charge carrier generating layer.

8. An electrophotographic light-sensitive material claimed in claim 4, wherein said layer has a thickness of about 3 to 30μ.

9. An electrophotographic light-sensitive material claimed in claim 8, wherein said layer has a thickness of about 5 to 20μ.

10. An electrophotographic light-sensitive material claimed in claim 7, wherein said electric charge carrier generating layer has a thickness of from about 4μ or less, and said electric charge carrier transporting layer has a thickness of from about 3 to 30μ.

11. An electrophotographic light-sensitive material claimed in claim 10, wherein said electric charge carrier generating layer has a thickness of about 2μ or less, and said electric charge carrier transporting layer has a thickness of from about 5 to 20μ.

12. An electrophotographic light-sensitive material claimed in claim 4, wherein said layer further contains a binder and said tetrakisazo compound is present in said layer in an amount of from about 0.01 to 2 times the amount of said binder by weight, and said electric charge carrier transporting compound is present in an amount of from about 0.1 to 2 times the amount of said binder by weight.

13. An electrophotographic light-sensitive material claimed in claim 12, wherein the amount of said tetrakisazo compound in said layer is from about 0.05 to 1 time the amount of said binder by weight, and the amount of said electric charge carrier transporting compound in said layer is from about 0.3 to 1.3 times the amount of said binder by weight.

14. An electrophotographic light-sensitive material claimed in claim 4, wherein said tetrakisazo compound is present in an amount of from about 0.01 to 0.5 times the amount of said electric charge carrier transporting compound by weight.

15. An electrophotographic light-sensitive material claimed in claim 5, wherein said electric charge carrier generating layer further contains a binder, the amount of said tetrakisazo compound being about 0.1 or more based on the amount of said binder by weight, and said electric charge carrier transporting layer further contains a binder, the amount of said electric charge carrier transporting compound being from about 0.2 to 2 times the amount of said binder by weight.

* * * * *